United States Patent [19]

Ota et al.

[11] 3,973,088

[45] Aug. 3, 1976

[54] WIDE-BAND HYBRID NETWORK

[75] Inventors: Chuichi Ota, Tokyo; Yotaro Yatsuzuka, Yokohama, both of Japan

[73] Assignee: Kokusai Denshin Denwa Kabushiki Kaisha, Japan

[22] Filed: Nov. 26, 1974

[21] Appl. No.: 527,378

[30] Foreign Application Priority Data
Nov. 28, 1973 Japan............................ 48-132615

[52] U.S. Cl.......................................... 179/170 NC
[51] Int. Cl.²......................................... H04B 1/58
[58] Field of Search...... 179/170 R, 170 D, 170 NC

[56] References Cited
UNITED STATES PATENTS

| | | | |
|---|---|---|---|
| 3,180,947 | 4/1965 | Haselton, Jr. et al. | 179/170 NC |
| 3,700,831 | 10/1972 | Aagaard et al. | 179/170 NC |
| 3,711,660 | 1/1973 | Cherry | 179/170 NC |
| 3,855,430 | 12/1974 | Colardelle | 179/170 NC |

Primary Examiner—Kathleen H. Claffy
Assistant Examiner—Randall P. Myers
Attorney, Agent, or Firm—Robert E. Burns; Emmanuel J. Lobato; Bruce L. Adams

[57] ABSTRACT

A wide-band hybrid network, in which a signal received from a four-wire section is applied to a first balanced amplifier and a second balanced amplifier. The output of the first balanced amplifier is applied to one opposed terminals of a main bridge circuit which has an arm including terminals connected to a wide-band two-wire transmission line. The output of the second balanced amplifier is applied to one opposed terminals of an auxiliary bridge circuit which has an arm substantially equivalent to the impedance of the wide-band two-wire transmission line. A differential amplifier is employed for receiving signals of respective other opposed terminals of the main bridge circuit and the auxiliary bridge circuit. The output of the differential amplifier is applied to another four-wire section.

6 Claims, 10 Drawing Figures

WIDE-BAND HYBRID NETWORK

BACKGROUND OF THE INVENTION

This invention relates to a wide-band hybrid network, which employs a wide-band, two-wire transmission line and enables simultaneous long-distance transmission of a wide-band signal in two directions over the entire transmission frequency band of the transmission line.

A conventional wide-band, two-way transmission system of the two-wire type for long-distance transmission with a large capacity is a frequency division transmission system, in which in case of an analog signal such as an FDM-AM (frequency division multiplex-amplitude modulation) signal, the entire frequency band of the transmission system is divided into two frequency bands, so that the divided bands are used for different transmission directions. However, this system is defective in that the band used for each direction is half the entire frequency band and in that expensive directional filters must be used for terminal equipments and respective repeaters. Further, there has also been proposed a two-wire, two-way simultaneous transmission system utilizing the entire frequency band of the transmission system by the employment of hybrid circuits. In this case, however, the leakage characteristic of the hybrid circuit has the following technical problems:

i. the balance of the hybrid circuit itself, and
ii. the impedance mis-matching between the hybrid circuit and the two-wire transmission line.

Moreover, such a hybrid circuit as herebefore employed for two-wire to four-wire conversion for an analog signal has a very narrow frequency band, so that the leakage due to the incompleteness of balance of the hybrid circuit itself mentioned at the item (i) does not cause any trouble but the leakage caused by the impedance mis-matching between the hybrid circuit and the two-wire transmission line and reflection due to impedance mismatching in the two-wire transmission line and terminal equipments present a problem as mentioned in item (ii). On the other hand, in such wide-band transmission system as the type to which this invention is applied, a high quality transmission line such as a coaxial cable is employed, so that (i) the balance of the hybrid circuit itself is more important than the problem (ii). It is appreciably difficult to realize a highly balanced hybrid circuit over a wide band. In the case of using conventional hybrid circuits, the intervals of repeaters become short due to leakage so that the application of such conventional hybrid circuits to a long-distance transmission system is difficult.

In a two-wire, simultaneous two-way transmission system for transmitting PCM base band signals, it is impossible to apply such frequency division transmission technique to this system, as employed in an analog transmission system, so that a system employing hybrid circuits is taken into consideration. However, a two-way transmission system employing hybrid circuits encounters the problem of leakage as does the case of the analog transmission and, therefore, it is very difficult to realize such an intended system by the use of the conventional hybrid circuits.

SUMMARY OF THE INVENTION

An object of this invention is to provide a wide-band hybrid network having a hybrid function with little leakage and capable of performing long-distance, simultaneous two-way transmission at high efficiency in a two-wire, wide band transmission system.

BRIEF DESCRIPTION OF THE DRAWINGS

The principle, construction and operation of this invention will be clearly understood from the following detailed description taken in conjunction with the accompanying drawings, in which.

DESCRIPTION OF THE PREFERRED EMBODIMENTS

Figure 1:
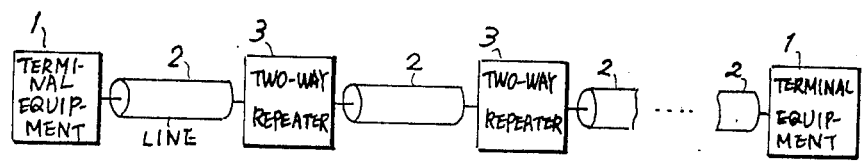
FIG. 1 is a connection diagram illustrating the construction of a two-wire simultaneous two-way transmission system to which this invention is applied.

A description will be first given for the relationship between the hybrid network of this invention and a two-wire transmission line. With reference to FIG. 1 schematically showing a two-wire, simultaneous two-way transmission system to which this invention is applied, reference numeral 1 indicates terminal equipments, each composed of a network of this invention having a hybrid function, multiplexers and demultiplexers, and 2 designates two-wire transmission lines such as coaxial cables. Reference numeral 3 identifies two-way repeaters respectively employing networks hybrid of this invention each having a hybrid function. In case of analog transmission, these repeaters are two-way analog repeaters, each composed of two repeating amplifiers which equalize and amplify analog signals respectively transmitted in opposite directions. In case of digital transmission, such as PCM, they are two-way PCM regenerative repeaters each composed of two regenerative repeaters, which equalize and amplify the PCM pulses respectively transmitted in opposite directions and then regenerate amplified pulses having levels higher than a certain threshold value to send out the regenerated pulses.

Figure 2:
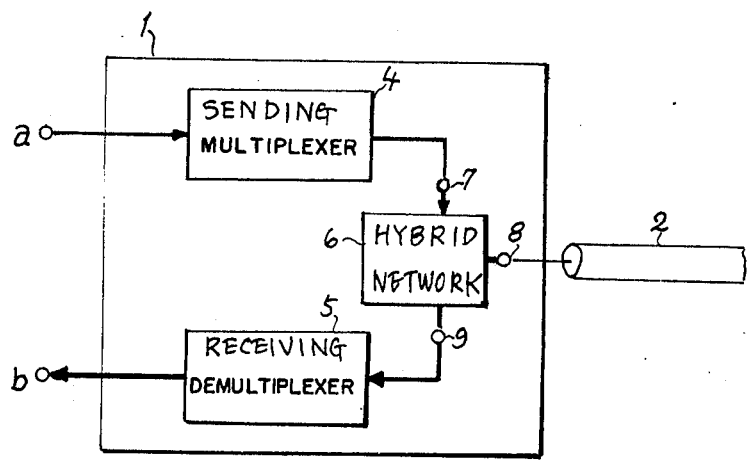
FIGS. 2 and 3 are block diagrams illustrating the constructions of a terminal equipment and a two-way repeater to which this invention is applied.

In FIG. 2 illustrating one example of the construction of the terminal equipment 1 in FIG. 1, the terminal equipment 1 comprises a sending multiplexer 4, a receiving demultiplexer 5 and a hybrid network 6. Signals from a plurality of input channels a are multiplexed by the sending multiplexer 4 and applied to a receiving terminal 7 of the hybrid network 6 and then sent out therefrom to the transmission line 2 through a two-directional terminal 8. On the other hand, the multiplexed signal from the transmission line 2 is applied to the two-directional terminal 8 of the hybrid network 6 and then sent out through terminal 9 to a receiving demultiplexer 5, from which separated output signals are sent out to a plurality of output channels b respectively.

Figure 3:
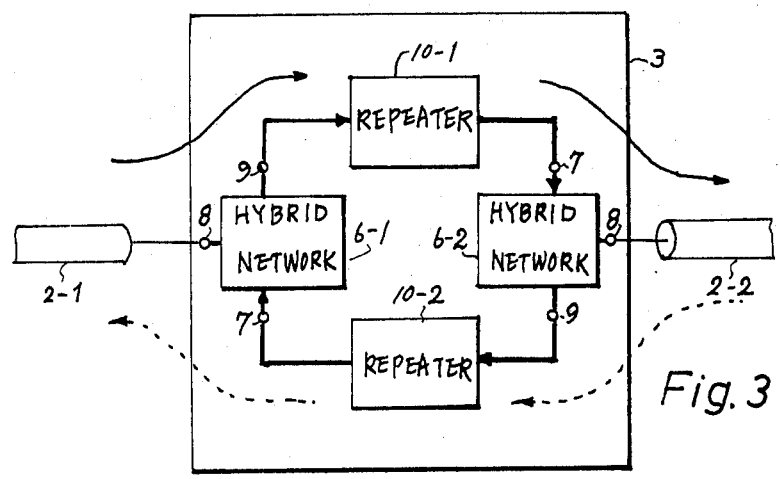

In FIG. 3 showing one example of the construction of the two-way repeater 3 in FIG. 1, reference numerals 6–1 and 6–2 denote hybrid networks (identical with 6 in FIG. 2); 10–1 and 10–2 represent repeaters; and 2–1 and 2–2 designate two-wire transmission lines. An eastwardly transmitted signal (indicated by solid lines) applied to the two-directional terminal 8 of the hybrid network 6–1 from the transmission line 2–1 is derived from a sending terminal 9 through the hybrid network 6–1 and then applied to the eastward repeater 10–1 of four-wire section. Thereafter, the signal is amplified or regenerated and applied to a receiving terminal 7 of the hybrid network 6–2 and then sent out to the two-wire transmission line 2—2 from the two-directional terminal 8 through the hybrid network 6–2. A westwardly transmitted signal (indicated by broken lines) applied from the two-wire transmission line 2—2 to the two-directional terminal 8 of the hybrid network 6–2 is applied through the sending terminal 9 of the hybrid network 6–2 to the westward repeater 10–2 of four-wire section. The amplified or regenerated signal is applied to the receiving terminal 7 of the hybrid network 6–1 and then sent out to the transmission line 2–1 from the two-directional terminal 8. In this case, if the signals of the both directions are separated from each other at the sending terminal 9 of each of the hybrid networks 6–1 and 6–2 to such an extent that a leakage component of the signal transmitted in the reverse direction from the sending terminal 7 is negligible in comparison with the signal transmitted in the forward direction, it is possible to achieve bilateral transmission in the east direction and the west direction over the entire frequency band of the transmission line.

The hybrid network of this invention will hereinafter be described with regard to a case where it is applied to the repeaters in FIG. 3. However, since the hybrid networks used in the both directions are identical with each other, the following will be described for the hybrid network in one direction only.

Figure 4:
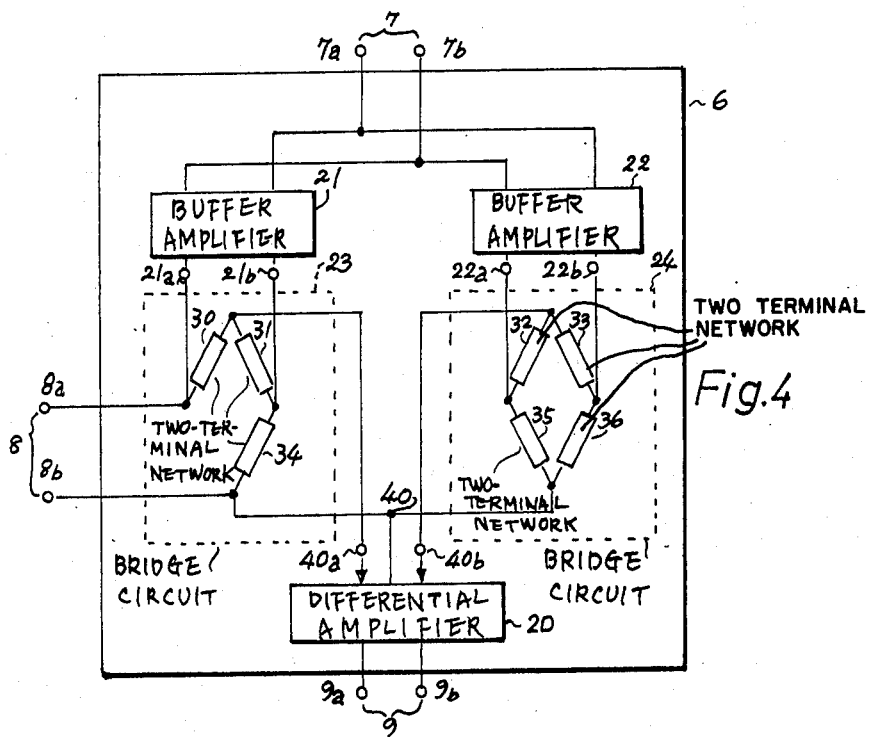
FIGS. 4 and 5 are diagrams each illustrating an embodiment of this invention.

FIG. 4 illustrates one embodiment of the hybrid network of this invention, which employs two bridge circuits as a main bridge circuit and an auxiliary bridge circuit. In FIG. 4, the terminals 8 (8a, 8b) are connected to the two-wire transmission line 2, and the sending terminals 9 (9a, 9b) of a differential amplifier 20 is connected to the input terminal of the repeater 10 (10–1, 10–2) for applying thereto the output signal to the four-wire section while the receiving terminals 7 (7a, 7b) are connected to the output terminal of the repeater 10 (10–1, 10–2) for receiving the output signal of the four-wire section. Reference numerals 30 to 36 indicate two-terminal networks, and the networks 34, 35 and 36 are two-terminal networks (i.e. artificial impedance networks) having an impedance substantially equivalent to that viewed from the two-directional terminal 8 to the two-way transmission line. The networks 34 and 36 are second artificial impedance networks, while the network 35 is a first artificial impedance network. Reference numerals 40a–40 and 40b–40 designate input terminals of the differential amplifier 20 with respect to ground 40; 21a and 21b represent output terminals of a balanced buffer amplifier (first buffer amplifier) 21; 22a and 22b denote output terminals of a balanced buffer amplifier (second buffer amplifier) 22; 23 identifies a main bridge circuit; and 24 shows an auxiliary bridge circuit. The bridge circuits 23 and 24 are each balanced.

The main bridge circuit 23 and the auxiliary bridge circuit 24 have corresponding structures. One arm of the main bridge circuit 23 is defined by a first pair of terminals 8a, 8b for the connection with the two-wire wide-band transmission line, and the two-terminal impedance network 35 is connected within the auxiliary bridge circuit 24 across nodes corresponding to the first pair of terminals 8a, 8b. A second pair of terminals defined by a pair of opposed nodes of the main bridge circuit are connected to the first buffer amplifier 21 output terminals 21a, 21b, and a third pair of terminals are defined by the other pair of opposed nodes of the main bridge 23 and are connected across an input of the differential amplifier 20. The second pair of terminals of the main bridge circuit 23 correspond to the input terminals of the auxiliary bridge 24, and the third pair of terminals of the main bridge circuit 23 correspond to the output terminals of the auxiliary bridge 24.

Next, the operation of the hybrid network 6 will be described. The bridge circuits 23 and 24 serving as the main bridge circuit and the auxiliary bridge circuit, respectively, and the balanced buffer amplifiers 21 and 22 are produced by IC techniques and can be formed to have substantially identical electric characteristics, and equal to each other. The bridge circuits 23 and 24 are in their balanced states where the product of the impedances of the two-terminal networks 30 and 34 is equal to the product of the input impedance of the two-way transmission line connected to the two-directional terminals 8 (8a, 8b) and the impedance of the two-terminal network 31. In the auxiliary bridge circuit 24, the products of the impedances of two pairs of the two-terminal networks of the opposed arms of the bridge are equal to each other. For example, the impedances of the two-terminal networks 30, 31, 32 and 33 are determined to be equal to one another, and the impedances of the artificial two-terminal impedance networks 34, 35 and 36 are substantially equivalent to the input impedance viewed from the two-directional terminal 8 to the transmission line, so that the main bridge circuit 23 and the auxiliary bridge circuit 24 are balanced, respectively. Thus, since the characteristic impedance of the two-wire transmission line such as a coaxial cable is substantially constant over a wide frequency band, if the impedances of the artificial two-terminal impedance networks 34, 35 and 36 are determined to be substantially equivalent to the input impedance viewed from the two-directional terminals 8 to the two-way transmission line, these bridge circuits 23 and 24 can easily be balanced. Further, even where the characteristic impedance of the two-wire transmission line varies with respect to frequency or time, if a pad is inserted between the transmission line and the two-directional terminals 8, the impedance viewed from the two-directional terminals 8 to the two-wire transmission line can be made substantially constant so that the bridge circuits can be balanced. A forward signal transmitted from the two-wire transmission line to the balanced bridge circuit 23 through the two-directional terminal 8 is applied across the input terminals 40a–40 of the differential amplifier 20 through the two-terminal network 30. At this time, an input corresponding to this signal is not applied from the auxiliary bridge circuit 24 so that the forward signal at the terminals 40a–40 is amplified by the differ amplifier 20 and thereafter sent out from the terminals 9 as an output of the four-wire section to the repeating amplifier 10–1 or 10–2 for forward transmission. On the other hand, a backward signal (an output of the four-wire section) applied to the receiving terminals 7 from the repeating amplifier 10–1 or 10–2 for backward transmission is applied to the bridge circuits 23 and 24, respectively, through the balanced amplifiers 21 and 22 each having the function of a buffer for separating the bridge circuits 23 and 24 from each other. Thereafter, the signal is sent out to the two-wire transmission line from the two-directional terminals 8 of the main bridge circuit 23.

Figure 6A:
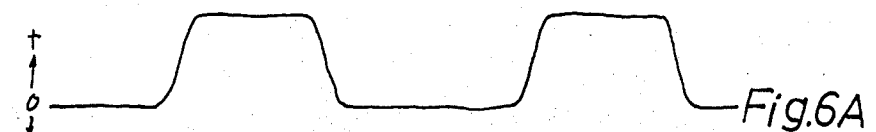
FIG. 6, comprised of 6A–6E, is a wave form diagram explanatory of the pulse transmission characteristic in the hybrid network of this invention.
Figure 6B:
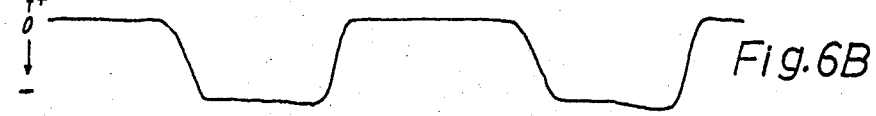

Now, it is very difficult to obtain a completely balanced wideband amplifier. In case of pulse transmission, even if the bridge circuit 23 is balanced, unbalance components appear as the terminals 40a–40, and 40b–40 due to unbalance of the balanced amplifiers 21 and 22, which causes a crosstalk leakage with respect to the forward signal to deteriorate the signal-to-noise ratio. Referring now to FIGS. 6A and 6B, this state will be described in connection with the case of the PCM transmission. FIG. 6A shows the waveform of the backward signal between the output terminal 21a of the balanced amplifier 21 and a terminal 40 and between the output terminal 22a of the balanced amplifier 22 and the terminal 40. FIG. 6B shows the waveform of the backward signal between the terminals 21b and 40 and between the terminal 22b and 40. The positive and negative waveforms of these signals are symmetrical with respect to the terminal 40 when the balanced amplifiers 21 and 22 are completely balanced.

Figure 6C:
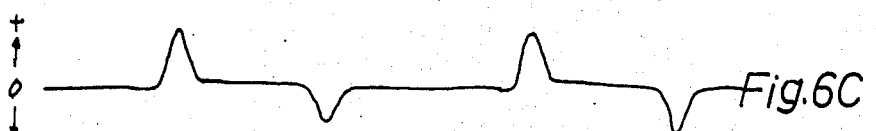
Figure 6D:
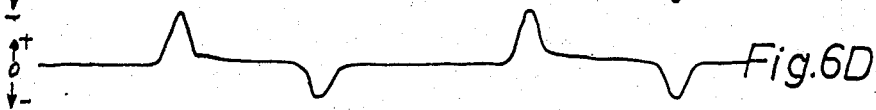
Figure 6E:
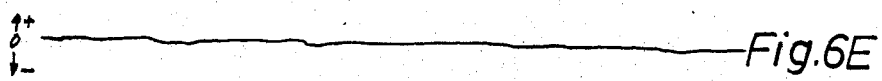

In the wideband transmission, however, as shown in FIGS. 6A and 6B, the waveforms are slightly different in the rise time, the fall time and the amplitude of each pulse, so that the positive and negative waveforms will not be symmetrical with respect to the terminal 40 and will produce unbalance components. This unbalanced components appear at the terminals 40a–40, and 40b–40, as shown in FIGS. 6C and 6D, even if the bridge circuits are balanced. If balanced amplifiers produced by the IC techniques are used as the two balanced amplifiers 21 and 22, even where such an unbalanced state occurs, the balanced amplifiers 21 and 22 can have the same unbalance state. Consequently, as shown in FIGS. 6C and 6D, leakages of the backward signal at the terminals 40a–40 and 40b–40 are of the same phase and amplitude, so that these leakage components are cancelled out by each other by the common mode rejection characteristic of the differential amplifier 20 and then these leakages are not transmitted to the sending terminal 9. This state is shown in FIG. 6E.

As a result of the above operation, if the ratio of the forward signal level to the leakage level of the backward signal across the sending terminals 9 (9a, 9b), when the backward signal level across the output terminals 21a and 21b of the balanced amplifier 21 and the forward signal level across the terminals 8a and 8b are made equal to each other, is taken as the amount of attenuation of the leakage, the leakage characteristic is improved by the balanced main bridge circuit 23 and common mode rejection of the differential amplifier 20, as compared with the conventional hybrid circuit.

The above example has been described with regard to a case where the main bridge circuit 23 and the auxiliary bridge circuit 24 are in their balanced states. However, even where these bridge circuits 23 and 24 are not balanced, the leakage of the backward signals to the differential amplifier 20 from the terminals 40a–40 and 40b–40 are made equal to each other by adjusting the first artificial two-terminal impedance network 35 or by inserting an adjustment circuit between the auxiliary bridge circuit 24 and the terminal 40b so as to put the bridge circuits 23 and 24 in the same unbalanced state, whereby it is possible that the leakage of the backward signal due to unbalance of the bridge circuits is removed by the differential amplifier 20.

Next, examples of values will be given when the bridge circuits 23 and 24 are in their balanced states. The ratio of the backward signal level across the terminals 21a and 21b to the leakage level across the terminals 40a and 40 within a frequency band 0 to 100 MHz is about 40 dB. Further, if the common mode rejection gain of the differential amplifier 20 is taken as −20 dB, the leakage level ratio at the sending terminal 9 can be improved to −60 dB. Moreover, assuming that attenuation of the forward signal in the bridge circuit 23 is 10 dB and that the differential gain of the differential amplifier 20 is 20 dB, the ratio of the forward signal level to the leakage level of the backward signal at the sending terminals 9 (9a and 9b) is 70 dB, annd a leakage attenuation characteristic with a very high degree of separation can be obtained. The leakage attenuation characteristic can be further improved by the use of a differential amplifier having a highly balanced and having a higher common mode rejection ratio, and better balanced bridge circuits.

The foregoing description has been given in connection with the case where the two-wire transmission line is connected to the two-directional terminal 8 led out from the opposite arm of the two-terminal network 31 in the main bridge circuit 23. However, it is also possible to lead out the terminal 8 from the opposite arm of the two-terminal network 34, that is, from the both ends of the two-terminal network 30. In this case, after the two-terminal network 30 is removed, a two-terminal network is inserted in the arm opposite to the two-terminal network 31 while the two-wire transmission line is connected to the new terminal 8 through a transformer.

Figure 5:
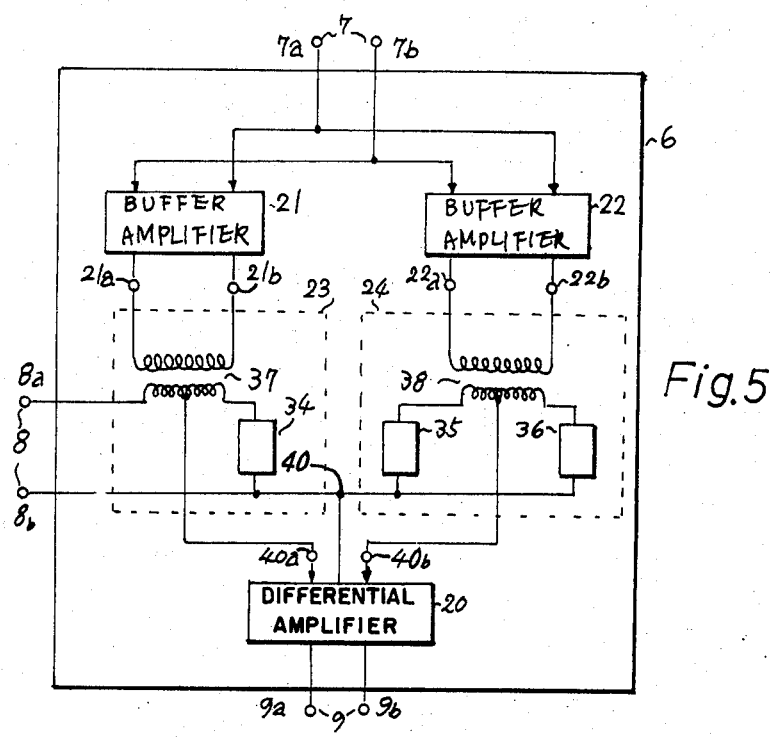

FIG. 5 is a diagram showing another embodiment of this invention, which can perform exactly the same operation as that obtainable with the example of FIG. 4 by employing two three-winding transformers as bridge circuits instead of using the main bridge circuit 23 and the auxiliary bridge circuit 24 of two-terminal networks as shown in FIG. 4, but by the use of the other circuit elements in the same manner as in FIG. 4. In FIG. 5, reference numeral 37 indicates a main three-winding transformer, and 38 designates an auxiliary three-winding transformer. In a case where the turns ratio of the three-winding transformer. In a case where the turns ratio of the three-winding transformers of equal electric characteristics is 1 : 1, the output impedances across output terminals 21a and 21b and across 22a and 22b of the buffer amplifiers 21 and 22 are determined to be twice as high as the input impedances across the input terminals 40a–40 and 40b–40 of the differential amplifier 20 to obtain balance of the hybrid network 6. However, the impedances of the artificial impedance networks 34, 35 and 36 are established to be substantially equivalent to the impedance viewed from the two-directional terminal 8 to the two-wire transmission line as in the case where the bridge circuit is employed. In this case, loss of the forward signal in the main three-winding transformer 37 is 6 dB and the loss can be reduced as compared with the aforesaid construction employing the bridge circuits. Further, even where the three-winding transformers 37 and 38 are in their slightly unbalanced states, if the auxiliary three-winding transformer 38 is adjusted, or an adjusting circuit is inserted between the terminal 40b–40 and the auxiliary three-winding transformer 38 so that leakages applied to the differential amplifier 20 from the auxiliary three-winding transformer 38 and the main three-winding transformer 37 may become substantially equal to each other, these leakages can be cancelled by the differential amplifier 20. As a result of this operation, the leakage attenuation characteristic of the backward signal can be greatly improved. Further, the construction employing such three-winding transformers is suitable for use in the analog transmission rather than the PCM transmission in which cutoff of the transformers at low frequencies presents a problem. The principles of the operation of the embodiment shown in FIG. 5 is the same as that shown in FIG. 4, and hence details will not be described.

In the foregoing embodiments, an unbalanced amplifier and an unbalance to balance converter may also be used as the buffer balanced amplifiers 21 and 22.

As is evident from the foregoing description, the hybrid network of this invention can provide an excellent leakage attenuation characteristic of excellent leakage ratio of the forward signal to the leakage from the backward signal. By using these hybrid networks in terminal equipments and in two-way repeaters, signals can be simultaneously transmitted in both directions through a two-wire transmission line over its entire frequency band. Further, long-distance transmission is also possible and economical, and efficient two-wire, wide-band, simultaneous two-way transmission systems can be obtained.

What we claim is:

1. A wide-band hybrid network, comprising:
   a first buffer amplifier receiving an input from a first four-wire section;
   a second buffer amplifier connected in parallel with said first buffer amplifier to receive the same input from the first four-wire section;
   a differential amplifier having a pair of inputs and having an output for connection to a second four-wire section;
   a main bridge circuit having a first pair of terminals connected to a wide-band two-wire transmission line, a second pair of terminals receiving an output of said first buffer amplifier, and a third pair of terminals for deriving therefrom an output connected across one input of said differential amplifier and ground; and
   an auxiliary bridge circuit having a structure corresponding to the structure of said main bridge circuit, including a pair of input terminals for receiving the output of said second buffer amplifier and which correspond to the second pair of terminals of said main bridge circuit, a pair of output terminals for applying an output across the other input of said differential amplifier and ground and which correspond to the third pair of terminals of said main bridge circuit, and a first two-terminal impedance network having an impedance substantially equivalent to the impedance of the wide-band two-wire transmission line and which is connected within said auxiliary bridge circuit across nodes corresponding to the first pair of terminals of said main bridge circuit to which the wide-band two-wire transmission line is connected;
   whereby the input from the wide-band two-wire transmission line is transmitted to the output of the differential amplifier as an output applied to said second four-wire section while said input from said first four-wire section is applied to said wide-band two-wire transmission line.

2. A wide-band hybrid network according to claim 1, in which each of said first buffer amplifier and said second buffer amplifier comprises a balanced amplifier.

3. A wide-band hybrid network according to claim 1, in which said main bridge circuit comprises a first bridge circuit having three arms of two-terminal networks and one arm providing at two ends thereof said first pair of terminals, said second pair of terminals being provided at one pair of opposed nodes of said first bridge circuit, said third pair of terminals being provided at the other pair of opposed nodes of said first bridge circuit.

4. A wide-band hybrid network according to claim 1, in which said auxiliary bridge circuit comprises a second bridge circuit having four arms of two-terminal networks including said first two-terminal impedance network, said pair of input terminals being provided as one opposed pair of nodes of said second bridge circuit, and said pair of output terminals being provided at the other opposed pair of nodes of said second bridge circuit.

5. A wide-band hybrid network according to claim 1, in which said main bridge circuit comprises a transformer and a second two-terminal impedance network having an impedance substantially equivalent to that of said wide-band two-wire transmission line, the primary winding of said transformer being connected to the output of said first buffer amplifier, the secondary winding being connected to said wide-band two-wire transmission line through said second two-terminal impedance network, said third pair of terminals being provided at the neutral point of the secondary winding and a junction between said second two-terminal impedance network and said wide-band two-wire transmission line.

6. A wide-band hybrid network according to claim 1, in which said auxiliary bridge circuit comprises a transformer and first and second two-terminal impedance networks each having an impedance substantially equivalent to that of said wide-band two-wire transmission line, the primary winding of said transformer being connected to the output of said second buffer amplifier, the secondary winding of the transformer being connected to a series-connection of said first and second two-terminal impedance networks, said pair of output terminals being provided at the neutral point of said secondary winding and at a junction between said first and second two-terminal impedance networks.

* * * * *